US005866871A

United States Patent [19]

Birx

[11] Patent Number: 5,866,871

[45] Date of Patent: Feb. 2, 1999

[54] PLASMA GUN AND METHODS FOR THE USE THEREOF

[76] Inventor: Daniel Birx, Rte. 2, 1740, 3300 Crismore La., Oakley, Calif. 94561

[21] Appl. No.: 847,434

[22] Filed: Apr. 28, 1997

[51] Int. Cl.[6] .................... B23K 10/00

[52] U.S. Cl. .................... 219/121.48; 219/121.59; 219/121.52; 219/121.57; 378/119; 315/111.21

[58] Field of Search .................... 219/121.52, 121.59, 219/121.54, 121.57, 75, 121.48; 315/111.21, 331; 378/34, 119; 123/620

[56] References Cited

U.S. PATENT DOCUMENTS

| | | | |
|---|---|---|---|
| 3,150,483 | 9/1964 | Mayfield et al. | 60/35.5 |
| 3,232,046 | 2/1966 | Meyer et al. | 60/35.5 |
| 3,279,176 | 10/1966 | Boden et al. | 60/202 |
| 3,296,410 | 1/1967 | Hedgo | 219/121.52 |
| 3,586,905 | 6/1971 | Bignell | 219/121.52 |
| 3,961,197 | 6/1976 | Dawson | 250/493 |
| 3,969,628 | 7/1976 | Roberts et al. | 250/402 |
| 4,142,089 | 2/1979 | Lau et al. | 219/76.16 |
| 4,203,393 | 5/1980 | Giardini | 123/30 |
| 4,364,342 | 12/1982 | Asik | 123/143 |
| 4,369,758 | 1/1983 | Endo | 123/620 |
| 4,504,964 | 3/1985 | Cartz et al | 378/119 |
| 4,507,588 | 3/1985 | Asmussen et al. | 315/39 |
| 4,536,884 | 8/1985 | Weiss et al. | 378/119 |
| 4,538,291 | 8/1985 | Iwamatsu | 378/119 |
| 4,561,406 | 12/1985 | Ward | 123/536 |
| 4,618,971 | 10/1986 | Weiss et al. | 378/34 |
| 4,633,492 | 12/1986 | Weiss et al. | 378/119 |
| 4,635,282 | 1/1987 | Okada et al. | 378/34 |
| 4,665,296 | 5/1987 | Iwata et al. | 315/331 |
| 4,774,914 | 10/1988 | Ward | 123/162 |
| 4,837,794 | 6/1989 | Riordan et al. | 378/119 |
| 4,891,490 | 1/1990 | Labrot et al. | 219/121.52 |
| 5,241,244 | 8/1993 | Cirri | 315/111.4 |
| 5,442,910 | 8/1995 | Anderson | 60/266 |

OTHER PUBLICATIONS

Giordano, G., T. Letardi, F. Muzzi and E. Zheng., "Magnetic pulse compressor for prepulse discharge in spiker–sustainer excitation technique for XeCl lasers." *Rev. Sci. Instrum,* 65(8):2475–2481, 1994.

Jahn, Robert G., *Physics of Electric Propulsion.*New York, McGraw–Hill Book Company, 1968, pp. i–325.

Matheu, J. W., "Formation of a High–Density Deuterium Plasm Focus." *The Physics of Fluids,*8(2):366–377, 1965.

Shiloh, J., A. Fisher and N. Rostoker., "Z Pinch of a Gas Jet." *Physical Review Letters,*40(8):515–518,1978.

Stallings, C. K. Childers, I. Roth and R. Schneider., "Imploding argon plasma experiments." *Appl. Phys. Lott.,* 35(7): 524–525, 1979.

Raven, A., P. T. Rumsby, J. A. Stamper, O. Willi, R. Illingworth and R. Thareja, "Dependence of spontaneous magnetic fields in laser produced plasmas on target size and structure." *Appl. Phys. Lott.,* 35(7): 526, 1979.

Pearlman, J. S., and J. C. Riordan, "X–ray lithography using a pulsed plasma source." *J. Vac. Sci Technol.,* 19(4):1190–1193, 1981.

Choi, P., A. E. Dangor, C. Deeney and C. D Challis, "Temporal development of hard and soft x–ray emission from a gas–puff Z pinch." *Rev. Sci. Instrum.,* 57(8):2162–2164, 1986.

Matthews, S. M. and R. S. Cooper, "Plasma sources for x–ray lithography." *SPIE,*333:136–139, 1982.

Bailey, J., Y. Ettinger and A. Fisher, "Evaluation of the gas puff z pinch as an x–ray lithography and microscopy source." *Appl. Phys. Lett.,*40(1):33–35, 1982.

"Gas plasmas yield x–rays for lithography," *Electronics,*Jan. 27, 1982, pp. 40–41.

*Primary Examiner*—Mark H. Paschall
*Attorney, Agent, or Firm*—Wolf, Greenfield & Sacks, P.C.

[57] ABSTRACT

A high pulse repetition rate (PRF) plasma gun is provided which gun inlets a selected propellant gas into a column formed between a center electrode and a coaxial outer electrode, utilizes a solid state high repetition rate pulse driver to provide a voltage across the electrodes and provides a plasma initiator at the base of the column, which is normally operative when the driver is fully charged. The plasma expands from the base end of the column and off the exit end thereof. When used as a thruster, for example in space applications, the driver voltage and electrode lengths are selected such that the plasma for each pulse exits the column at approximately the same time the voltage across the electrode reaches zero, thereby maximizing the thrust. When used as a radiation source, and in particular a source for radiation in the EUV band, the voltage and electrode length are selected such that the plasma exits the column when the current is maximum, which occur when the driver is roughly half discharged. The plasma is magnetically pinched as it exits the column, thereby raising the plasma temperature to provide thermal radiation at desired wavelengths. The plasma gun parameters can be selected to achieve a desired wavelength within the EUV band. The plasma gun of this invention, which is capable of operating at PRF in the range of approximately 100 Hz to in excess of 5,000 Hz, may also be used in other applications, and in particular in applications where low pressure near-vacuum environments are possible.

38 Claims, 3 Drawing Sheets

PLASMA GUN AND METHODS FOR THE USE THEREOF

FIELD OF THE INVENTION

This invention relates to plasma guns and more particularly to an improved plasma gun suitable for use as a space thruster or to produce radiation at selectable wavelengths within the extreme ultraviolet band. The invention also involves methods for utility such plasma guns.

BACKGROUND OF THE INVENTION

Thrusters currently utilized for satellite or other space stationkeeping and maneuvering applications utilize propellant gases with relatively low exhaust velocities (in the range of approximately 500 meters/sec to 2000 meters/sec). Examples of such thrusters include cold gas thrusters, which typically utilize valved nitrogen as the propellant and have very low specific impulses, and hydrazine thrusters, which are the thrusters most commonly used, but which also provide low specific impulses (although four times that of the cold gas thrusters). Hyrdazine thrusters also present tankage problems related both to liquid handling in zero gravity and to storing an unstable and highly corrosive fuel. Other available thruster technologies, including Teflon ablative thrusters, Hall thrusters, ion thrusters and MPD thrusters, while offering higher specific impulses, suffer from a variety of other problems, including being relatively massive, lack of temporal agility and/or requiring significant electrical energy storage, all of which has prevented use of such devices for space stationkeeping and maneuvering applications.

Since the lift weight of a satellite or other space vehicle is normally predetermined, the more weight or mass required for thruster propellants, the less is available for payload. It is therefor desirable to keep propellant mass to a minimum. Thus, since the thrust which can be achieved from a given mass of propellant increases substantially linearly with exhaust velocity, if exhaust velocity can be increased by for example a factor of ten, then the mass of propellant can either be reduced by a factor of ten, or the same mass or quantity of fuel/propellant will last ten times longer, thereby potentially extending the useful life of the space vehicle.

Another problem faced in industry is that as the density of integrated circuits and other micro-products formed using lithographic techniques increases, the wavelength of the radiation used for lithographic etching needs to be correspondingly reduced. In particular, for the next generation of lithography, radiation in the extreme ultraviolet (EUV) band, which extends from approximately 10A° (1 nm) to 1000A° (100 nm), and in particular at a wavelength approximately 130A° (13 nm) it is deemed critical. However, the only radiation source capable of operating in this band is large, cumbersome, expensive and operates at too low a pulse repetition frequency (PRF) for lithographic and many other applications. A practical source for generating radiation in this band, and in particular a source generating radiation at 13 nm, does not currently exist. A need therefor exists for a radiation source operating in this wavelength band which source is of usable size and cost and which generates radiation at wavelength and PRFs suitable for lithographic and other applications. More generally, a need exists for an EUV radiation source capable of generating radiation over at least a significant portion of this band, which source can be designed or programmed relatively easily and predictably by selecting various parameters to produce radiation at a desired wavelength within this band. In addition to lithography, such source might find application in various imaging or detection systems.

As is discussed later, plasma gun technology may be applied to dealing with the above problems. However, existing plasma guns have had reliability and pulse repetition frequency (PRF) limitations which has prevented their applicability in space applications, where long-term maintenance-free operation and high PRFs are requirements, and the relatively low PRFs has also prevented such plasma guns from being used for lithography. In particular, prior art coaxial plasma guns have required a very high power, extremely fast switch to instantaneously produce the drive. Large spark gap switches, which were the only components available which met the requisite specifications, have never operated at PRFs in excess of 100 Hz or for more than a few million shots without maintenance. As a result, plasma guns have never had PRFs exceeding 10 Hz. For space applications, PRFs in excess of 5000 Hz (pulses/sec) and maintenance free cycles exceeding 100 million pulses are desirable, while for lithography, PRFs of at least 500 Hz and preferably 1000 Hz are required.

Further, prior art plasma guns have utilized a dielectric insulator at the base of a coaxial column to create a voltage enhancement which helps force breakdown or plasma initiation at that point. Reliable, uniform plasma initiation could only be produced by applying a very high voltage very rapidly, and the dielectric is often quickly damaged by the resulting breakdown. Reliability and low PRF problems have therefor prevented plasma guns from being utilized as thrusters in space applications or as EUV radiation sources for lithographic or other applications. A need therefor exists for an improved plasma gun which provides the maintenance free reliability required for space applications along with relatively high PRFs, preferably in excess of 5,000 Hz for space, while being adapted to deliver exhaust velocities of 10,000 to 100,000 meters/sec. for space, and preferably in excess of 1000 Hz for radiation applications.

SUMMARY OF THE INVENTION

In accordance with the above, this invention provides a plasma gun, and in particular a high PRF plasma gun, having a center electrode and an outer electrode substantially coaxial with the center electrode, a coaxial column being formed between the electrodes. An inlet mechanism is provided for introducing a selected gas into the column and a plasma initiator is provided at the base end of the column. Finally, there is a solid state, high repetition rate pulsed driver which is operable on plasm initiation at the base of the column to deliver a high voltage pulse across the electrodes, the plasma expanding from the base end of the column and off the exit end thereof. The voltage of each of the pulses decreases over the duration of the pulse and, for one embodiment of the invention where the plasma gun is being utilized as a thruster, the pulse voltage and electrode length are selected such that the voltage across the electrodes reaches a substantially zero value as the plasma exits the column. For this embodiment, the inlet mechanism delivers the selected gas at the base end of the column. More particularly, for this embodiment, the inlet mechanism preferably introduces the gas radially from the center electrode, thereby enhancing plasma velocity uniformity across the column, plasma exiting the column for this embodiment at exhaust velocities which are currently in the range of approximately 10,000 to 100,000 meters/sec., the exhaust velocity utilized varying somewhat with application.

For some embodiments, the plasma initiator includes at least one hole formed in the base end of the cathode electrode, with it being preferable that such holes are evenly spaced around the electrode so as to provide more uniform plasma initiation. The selected gas may be introduced through the holes or may be introduced so as to be directed at the holes. The plasma initiator preferably also includes at least one trigger electrode which may be mounted in the holes or otherwise at the base of the column, which electrodes are preferably out of the column, but closely adjacent thereto, and are fired to initiate the plasma. For preferred embodiments, the trigger electrodes are substantially evenly spaced around the base end of the column and are fired substantially simultaneously to provide uniform initiation of the plasma at the base end.

The inlet mechanism preferably includes a pulsed valve. Since this valve is typically relatively slow compared to the plasma initiator and the pulse driver, the driver and initiator are typically operated a selected plurality of times for each operation of the pulsed valve.

For an alternative embodiment of the invention wherein the plasma gun is being utilized as a radiation source in the EUV band, the pulse voltage and electrode lengths are such that the current for each voltage pulse is at substantially its maximum as the plasma exits the column. The outer electrode for this embodiment of the invention is preferably the cathode electrode and may be solid or may be in the form of a plurality of substantially evenly spaced rods arranged in a circle. The inlet mechanism for this embodiment of the invention provides a substantially uniform gas fill in the column, resulting in the plasma being initially driven off the center electrode, the plasma being magnetically pinched as it exits the column thereby raising the plasma temperature to provide thermal radiation at desired wavelengths, which wavelengths are preferably in the extreme UV (EUV) band, which is roughly defined as a wavelength band from 1 nm to approximately 100 nm. As indicated earlier, a practical mechanism for generating radiation in this band does not currently exist. The desired wavelength in the EUV band is achieved by careful selection of various plasma gun parameters including the selected gas utilized, current from the pulse driver, plasma temperature in the area of the pinch and gas pressure in the column. Where the desired wavelength is approximately 13 nm, the selected gas is at least one of xenon and lithium vapor and the plasma temperature in the area of the magnetic pinch is in the range of approximately 500,000° K.

The pulse driver for this invention should deliver pulses having a voltage which is at least equal to the Paschen minimum breakdown voltage for the gun with fast rise times. For preferred embodiments, this voltage is generally at least 100 volts and for many embodiments is in the 400 to 800 volt range. For preferred embodiment, the pulse driver includes a source of dc potential, a dc-to-dc converter, and an energy storage medium fed by the converter, the storage medium discharging across the electrodes when the plasma is initiated. The storage medium may be a capacitor or bank of capacitors or may be part of at least one non-linear magnetic pulse compressor. The plasma initiator is operated when a selected energy or voltage is stored in the energy storage medium and preferably when the energy storage medium is fully charged. Where trigger electrodes are utilized, a separate non-linear magnetic pulse compressor operating from the same dc source may be provided for these electrodes, the trigger electrodes preferably being operated at higher voltage and lower power than the center and outer electrodes. The dc-to-dc convertor preferably recovers and stores waste energy reflected from the electrode for use during the next high voltage pulse.

The selected gas is preferable one of argon, xenon, nitrogen, hydrazine, lithium vapor, helium, hydrogen and neon. For the plasma gun to operate properly, the gas pressure in a column must be low enough so that breakdown for plasma initiation occurs on the low pressure side of the Paschen curve, and it is preferable that the plasma gun be contained in an environment having an ambient pressure in the 0.01 to 10 Torr range, with the pressure not exceeding approximately 1 Torr for preferred embodiments. The pulsed driver and plasma initiator should both have a pulse repetition frequency (PRF) such that the PRF of the plasma gun is in excess of 100 Hz and preferably in a range of approximately 500 Hz to at least 5,000 Hz.

The invention also includes a thruster for use in a substantially vacuum environment, which thruster includes the electrodes previously described, an inlet mechanism for introducing a selected gas at the base end of the column, a plasma initiator at the base end and the voltage driver, with the voltage of each pulse decreasing over the duration of the pulse, and with pulse voltage and electrode length being such that the voltage across the electrodes reaches a substantially zero value as the plasma exits the column. Exhaust velocities in the range of approximately 10,000 to 100,000 meters/sec. can currently be obtained using such thrusters.

The invention also includes a source of EUV radiation which comprises the electrodes previously described, the inlet mechanism and a pulse driver, with a current for each voltage pulse initially increasing to a maximum and then decreasing to zero, the pulse voltage and electrode lengths being such that the plasma reaches the end of the electrodes when the current is at its maximum. The plasma is initially driven off the center electrode and is magnetically pinched as it exits the column, raising the plasma temperature to provide thermal radiation at desired wavelengths, which desired wavelength(s) can be controlled by choosing the proper gas, high voltage current, plasma temperature in the area of the pinch and gas pressure in the column.

The invention also includes a method for utilizing a plasma gun of the type previously described as a thruster to provide a selected thrust in a substantially vacuum environment, which comprises the steps of valving a selected gas into the base end of the column; charging a solid state high repetition rate pulsed driver to a selected high voltage, the voltage being applied across the electrodes; initiating plasma breakdown at the base end when the driver is substantially at the selected high voltage, the plasma expanding from the base end of the column and being exhausted from the exit end of the column at a high exhaust velocity substantially concurrent with the driver becoming fully discharged and the charging and initiating plasma breakdown steps being repeated at high PRF until a selected thrust has been achieved. The valving step may be terminated when a quantity of selected gas sufficient to achieve the selected thrust has been introduced into the column.

Finally, the invention includes a method for utilizing a plasma gun of the type previously described to produce EUV radiation at a desired wavelength which comprises the steps of valving a selected gas into the column; charging a solid state high repetition rate pulse driver to a selected high voltage, which voltage is applied across the electrodes; initiating plasma breakdown at the base end of the column when the driver is substantially at the selected voltage, the plasma expanding from the base of the column and being exhausted from the exist end of the column adjacent the center electrode substantially concurrent with the driver current across the electrodes being a maximum. The plasma is magnetically pinched as it exits the column, raising the plasma temperature to provide thermal radiation at desired wavelength(s), which wavelength may be determined as previously indicated. The steps of charging the pulse driver and initiating plasma breakdown may be repeated at high PRF a selected number of times to provide the radiation for a desired duration.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
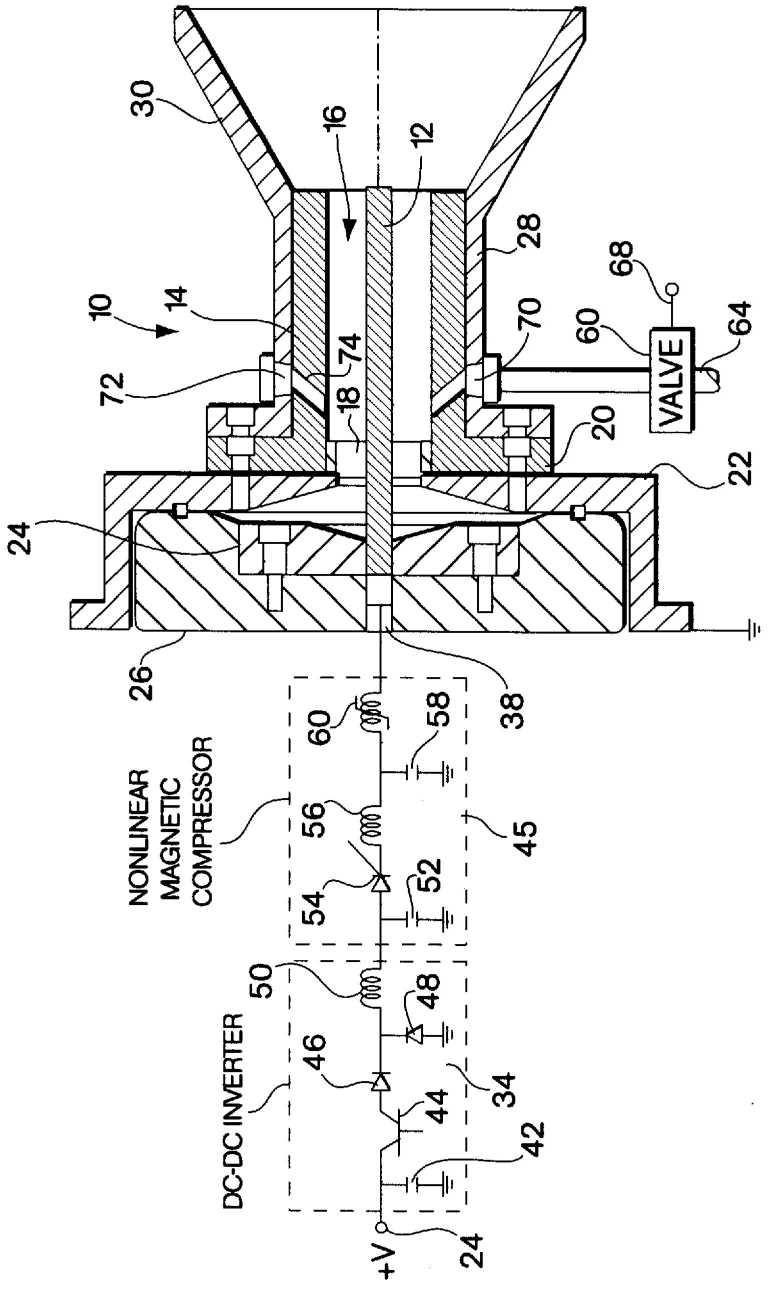
FIG. 1 is a semischematic, semi-side cutaway drawing of a first illustrative thruster embodiment of the invention.

Referring first to FIG. 1, the thruster 10 has a center electrode 12, which for this embodiment is the positive or anode electrode, and a concentric cathode, ground or return electrode 14, a channel 16 having a generally cylindrical shape being formed between the two electrodes. Channel 16 is defined at its base end by an insulator 18 in which center electrode 12 is mounted. Outer electrode 14 is mounted to a conductive housing member 20 which is connected through a conductive housing member 22 to ground. Center electrode 12 is mounted at its base end in an insulator 24 which is in turn mounted in an insulator 26. A cylindrical outer housing 28 surrounds outer electrode 14 and flares in area 30 beyond the front or exit end of the electrodes. The electrodes 12 and 14 may for example be formed of thoriated tungsten, titanium or stainless steel.

A positive voltage may be applied to center electrode 12 from a dc voltage source 32 through a dc-dc invertor 34, a nonlinear magnetic compressor 36 and a terminal 38 which connects to center electrode 12. Dc-dc invertor 34 has a storage capacitor 42, which may be a single large capacitor or a bank of capacitors, a control transistor 44, a pair of diodes 46 and 48 and an energy recovery inductor 50. Transistor 44 is preferably an insulated-gate bipolar transistor. Invertor 34 is utilized in a manner known in the art to transfer power from dc source 32 to nonlinear magnetic compressor 36. As will be discussed later, invertor 34 also functions to recover waste energy reflected from a mismatched load, and in particular from electrodes 12 and 14, to improve pulse generation efficiency.

Nonlinear magnetic compressor 36 is shown as having two stages, a first stage which includes a storage capacitor 52, a silicon controlled rectifier 54 and an inductor or saturable inductor 56. The second stage of the compressor includes a storage capacitor 58 and a saturable inductor 60. Additional compression stages may be provided if desired to obtain shorter, faster rising pulses and higher voltages. The manner in which nonlinear magnetic compression is accomplished in a circuit of this type is discussed in U.S. Pat. 5,142,166 and the description of this patent is incorporated herein by reference. Basically, circuit 36 uses the saturable cores as inductors in a resonance circuit. The core of each stage saturates before a significant fraction of the energy stored in the capacitors of the previous stage is transferred. The nonlinear saturation phenomenon increases the resonance frequency of the circuit by the square root of the decrease of the permeability as the core saturates. Energy is coupled faster and faster from one stage to the next. It should be noted that compression circuit 36 is efficient at transferring power in both directions since it not only acts to upshift the frequency in the forward direction, but also downshifts the frequency as a voltage pulse is reflected and cascades back up the chain. Energy which reflects from the mismatched load/electrodes can cascade back up the chain to appear as a reverse voltage being stored in capacitor 42 and to be added to the next pulse. In particular, when the reflected charge is recommuted into initial energy storage capacitor 42, current begins to flow in the energy recovery inductor 50. The combination of capacitor 42 and coil 50 forms a resonant circuit. After a half point [where $t=\pi/(L_{50}C_{42})^{1/2}$], the polarity of the voltage on capacitor 42 has been reversed, and this energy will reduce the energy required to recharge this capacitor from voltage source 32.

The drive circuits shown in FIG. 1 can also be matched to very low impedance loads and can produce complicated pulse shapes if required. The circuits are also adapted to operate at very high PRFs and can be tailored to provide voltages in excess of one Kv.

Propellant gas is shown in FIG. 1 as being delivered from a line 64, through a valve 66 under control of a signal on line 68, to a manifold 70 which feed a number of inlet port 72 in housing 28. There may, for example be four to eight ports 72 spaced substantially evenly around the periphery of housing 28 near the base end thereof. Ports 72 feed into holes 74 formed in electrode 14 which holes are angled to direct the propellant radially and inwardly toward the base of channel 16 near center electrode 12. Propellant gas may also be fed from the rear of channel 16.

Thruster 10 is designed to operate in space or in some other low pressure, near vacuum environment, and in particular at a pressure such that breakdown occurs on the low pressure side of the Paschen curve. While the pressure curve for which this is true will vary somewhat with the gas being utilized and other parameters of the thruster, this pressure is typically in the 0.01 to 10 Torr range and is approximately 1 Torr for preferred embodiments. For pressures in this range, increasing pressure in a region reduces the breakdown potential in that region, therefor enhancing the likelihood that breakdown will occur in such region. Therefor, theoretically, merely introducing the propellant gas at the base of column 16, and therefor increasing the pressure at this point, can result in breakdown/plasma initiation, occurring at this point as desired. However, as a practical matter, it is difficult both to control the gas pressure sufficiently to cause predictable breakdown and to have the pressure sufficiently uniform around the periphery of column 16 for breakdown to occur uniformly in the column rather than in a selected section of the column.

At least two things can be done to assure that plasma initiation occurs uniformly at the base of column 16 and that such breakdown occurs at the desired time. To understand how these breakdown enhancements are achieved, it should be understood that the plasma guns of this invention typically operate at pressures between 0.01 Torr and 10 Torr, and in particular, operate at pressures such that breakdown occurs on the low pressure side of the Paschen curve. For preferred embodiments, the pressure in column 16 is at approximately 1 Torr. In such a low pressure discharge, there are two key criteria which determine gas breakdown or initiation:

1. Electric field in the gas must exceed the breakdown field for the gas which depends on the gas used and the gas pressure. The breakdown field assumes a source of electrons at the cathode 14 that is known as the Paschen criteria. In the low pressure region in which the gun is operating, and for the dimensions of this device, the breakdown electric field decreases with increasing pressure (this occurring on the low pressure side of the Paschen curve). Therefor, breakdown occurs in column 16 at the point where the gas pressure is highest.

2. Second, there must be a source of electrons. Even if the average electric field exceeds the breakdown field, nothing will happen until the negative surface begins to emit electrons. In order to extract electrons from a surface, one of two conditions must occur. For the first condition, a potential difference must be produced near the surface which exceeds the cathode fall or cathode potential. The cathode fall/cathode potential is a function of gas pressure and of the composition and geometry of the surface. The higher the local gas pressure, the lower the required voltage. A reentrant geometry such as a hole provides a greatly enhanced level of surface area to volume and will also reduce the cathode fall. This effect, whereby a hole acts preferentially as an electron source with respect to adjacent surface, is denoted the hollow cathode affect. The second condition is that a source of electrons can be created by a surface flashous trigger source. These conditions may be met individually or both may be employed. However, the voltage across the electrodes should be less than the sum of the gas breakdown potential and cathode fall potential to prevent spurious initiation.

Thus, in FIG. 1, a plurality of holes 74 are formed in cathode 14 through which gas is directed to the base of column 16, which holes terminate close to the base of the column. For preferred embodiments, a plurality of such holes would be evenly spaced around the periphery of column 16. The gas entering through these holes, coupled with the hollowed cathode affect resulting from the presence of these holes, results in significantly increased pressure in the area of these holes near the base of column 16, and thus in plasma initiation at this place in the column. While this method of plasma initiation is adequate for plasma initiation in some applications, for most applications of the plasma gun of this invention, particularly high PRF applications, it is preferable that trigger electrodes also be provided in the manner described for subsequent embodiments so that both conditions are met to assure both the uniformity and timeliness of plasma initiation.

When thruster 10 is to be utilized, valve 66 is initially opened to permit gas from a gas source to flow through manifold 70 into holes 74 leading to channel 16. Since valve 66 operates relatively slowly compared to other components of the system, valve 66 is left open long enough so that a quantity of gas flows into channel 16 sufficient to develop the desired thrust through multiple plasma initiations. For example, the cycle time of a solenoid valve which might be utilized as the valve 66 is a millisecond or more. Since plasma bursts can occur in two to three microseconds, and since gas can typically flow down the length of the 5 to 10 cm electrodes used for thrusters of preferred embodiments in approximately 1/4000th of a second, if there was only one pulse for each valve cycle, only about 1/10 of the propellant gas would be utilized. Therefor, to achieve high propellant efficiency, multiple bursts or pulses, for example at least ten, occur during a single opening of the valve. During each individual burst of pulses, the peak power would be in the order of several hundred kilowatts so as to create the required forces. The peak PRF is determined by two criteria. The impulse time must be long enough so that the plasma resulting from the previous pulse has either cleared the thruster exit or recombined. In addition, the impulse time must be shorter than the time required for cold propellant to travel the length of the electrodes. The latter criteria is determined to some extent by the gas utilized. For argon, with a typical length for the column 16 of 5 cm, the time duration for propellant to spread over the thruster electrode surface is only 0.1 msec, while for a heavier gas such as xenon, the time increases to approximately 0.2 msec. Therefor, a high thruster pulse repetition rate (i.e. approximately 5,000 pps or greater) will enable the plasma gun to achieve a high propellant efficiency approaching 90%. The burst lengths of the pulses during a single valving of the fluid can be varied from a few pulses to several million, with some fuel being wasted and a lower propellant efficiency therefor being achieved for short burst lengths. Therefor, if possible, the burst cycle should be long enough to allow at least full use of the propellant provided during a minimum-time cycling of the valve 66.

Before the propellant reaches the end of column 16, gate transistor 44 is enabled or opened, resulting in capacitor 58 becoming fully charged to provide a high voltage across the electrodes (400 to 800 volts for preferred embodiments) which, either alone or in conjunction with the firing of a trigger electrode in a manner to be described later results in plasma initiation at the base of column 16. This results in a sheath of plasma connecting the inner and outer conductors, current flowing readily between the electrodes through the plasma sheath, and creating a magnetic filed. The resulting magnetic pressure pushes axially on the plasma sheath providing a JxB Lorentz force which accelerates the plasma mass as it moves along the electrodes. This results in a very high plasma velocity, and the electrode length and initial charge are selected such that the rms current across the electrodes which initially increases with time and then decreases to zero, and the voltage which decreased as capacitor 58 discharge, both return to zero just as the plasma is ejected from the tip of the electrodes. When the plasma reaches the end of the coaxial structure, all of the gas has been entrained or drawn into the plasma and is driven off the end of the electrodes. This results in maximum gas mass and thus maximum momentum/thrust for each pulse. If the length of the structure has been chosen so that the capacitor is fully discharged when the plasma exits the electrode, then the current and voltage are zero and the ionized slug of gas leaves thruster 10 at a high velocity. Exhaust velocity in for example the range of 10,000 to 100,000 meters/second can be achieved with thrusters operating in this manner with the exhaust velocity utilized being optimum for a given thruster application. Flared end 30 of the thruster, by facilitating controlled expansion of the exiting gases allows for some of the residual thermal energy to be converted to thrust via isentropic thermodynamic expansion, but this effect has been found to be fairly negligible and tapered portion 30 is not generally employed. In fact, except for protection of electrode 12, which is not generally required in space, the weight of thruster 10 may be reduced by completely eliminating housing 28. A pulse burst may be terminated by disabling gate transistor 44 or by otherwise separating source 32 from circuit 36.

Figure 2:
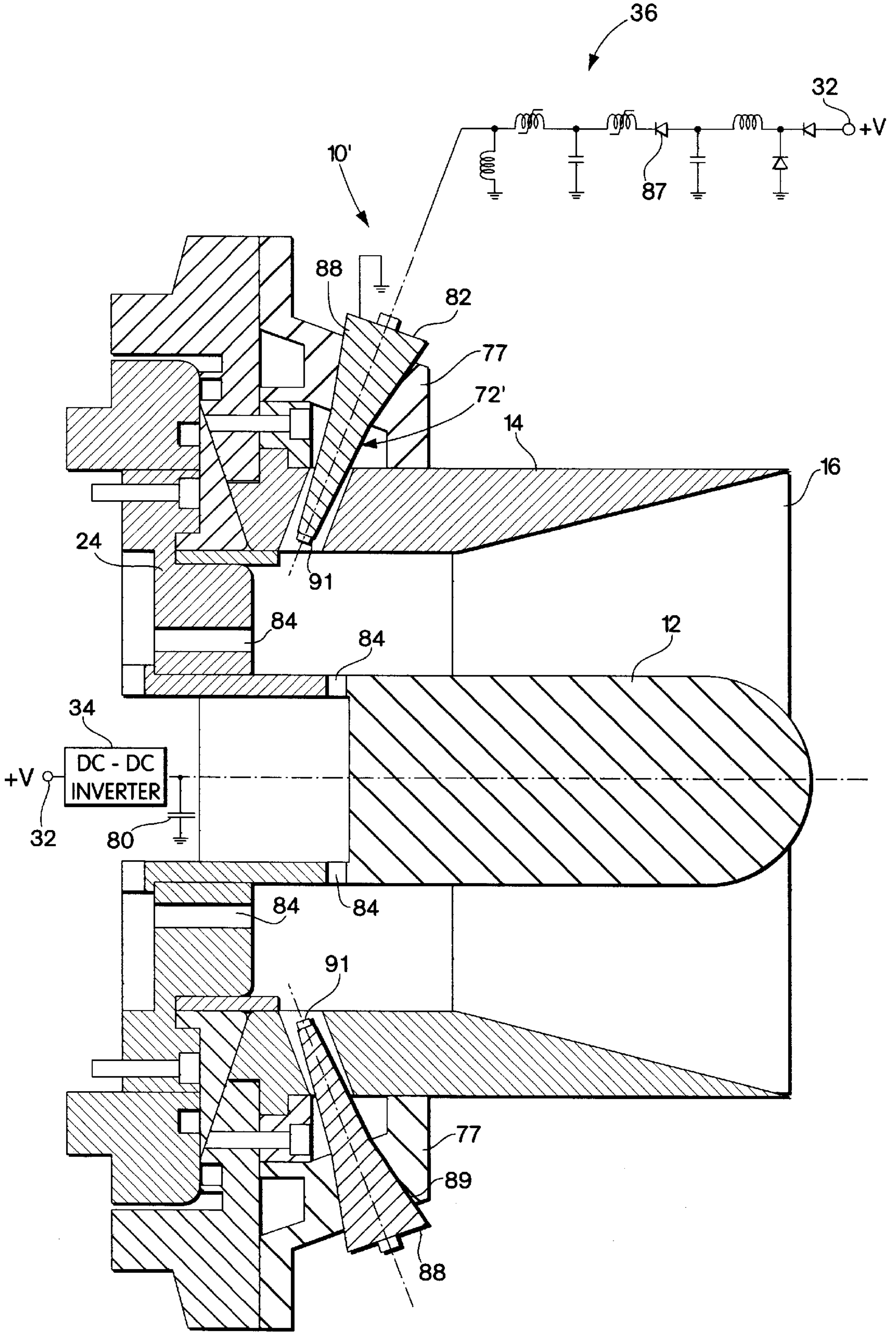
FIG. 2 is a semischematic, semi-cutaway side view drawing of alternative thruster embodiment of the invention.

FIG. 2 illustrates an alternative embodiment thruster 10' which differs in some respects from that shown in FIG. 1. First, nonlinear magnetic compressor 36 has been replaced by a single storage capacitor 80, which in practical applications would typically be a bank of capacitors to achieve a capacitance of approximately 100 microfarads. Second, cathode 14 tapers slightly towards its exit end. Third, spark plug-like trigger electrodes 82 are shown as being positioned in each of the holes 74 with a corresponding drive circuit 86 for the trigger electrodes; an internal gas manifold 72' formed by a housing member 77 is provided to feed propellant gas to holes 74, a gas inlet hole (not shown) being provided in member 77, and gas outlet holes 84 are shown formed in insulator 24 and in center electrode 12. As for the embodiment of FIG. 1, there would typically be a plurality of holes 74, for example four to eight, evenly spaced around the periphery of cathode 14, with a trigger electrode 82 in each hole 74 and a gas outlet 84 preferably opposite each hole 74 and directing gas thereat.

While the capacitor 80 may be utilized in some applications in lieu of nonlinear magnetic compressor circuit 36 in order to store voltage to provide high voltage drive pulses, such an arrangement would typically be used in applications where either lower PRFs and or lower voltages are required, since compressor 36 is adapted to provide both shorter and higher voltage pulses. Circuit 36 also provides the pulses at a time determined by the voltage across capacitor 58 and a breakdown of nonlinear coil 60, which is a more predictable time than can be achieved with capacitor 80, which basically charges until breakdown occurs at the base of column 16 permitting the capacitor to discharge.

Trigger electrodes 82 are fired by a separate drive circuit 86 which receives voltage from source 32, but is otherwise independent of invertor 34 and either compressor 36 or capacitor 80. Drive circuit 86 has two non-linear compression stages and may be fired in response to an input signal to SCR 87 to initiate firing of the trigger electrodes. The signal to SCR 87 may for example be in response to detecting the voltage or charge across capacitor 80 and initiating firing when this voltage reaches a predetermined value or in response to a timer initiated when charging of capacitor 80 begins, firing occurring when a sufficient time has passed for the capacitor to reach the desired value. With a compressor 36, firing could be timed to occur when inductor 60 saturates. Controlled initiation at the base of the column 84 is enhanced by the re-entrant geometry of hole 74, and also by the fact that channel 16 is narrower at the base end thereof, further increasing pressure in this area and thus, for reasons previously discussed, assuring initiation of breakdown in this area.

Each trigger electrode 82 is a spark-plug like structure having a screw section which fits in an opening 89 in housing 77 and is screwed therein to secure the electrode in place. The forward end of electrode 82 has a diameter which is narrower than that of the opening so that propellant gas may flow through hole 74 around the trigger electrode. For example, the hole may be 0.44 inches in diameter while the trigger electrode at its lowest point is 0.40 inches. The trigger element 91 of the trigger electrode extends close to the end of hole 74 adjacent column 16, but preferably does not extend into column 16 so as to protect the electrode against the plasma forces developed in column 16. The end of the electrode may, for example, be spaced from the end of hole 74 by a distance roughly equal to the diameter of the hole (7/16").

While trigger electrode 82 and plasma electrodes 12 and 14 are both fired from common voltage source 32, the drive circuits for the two electrodes are independent and, while operating substantially concurrently, produce different voltages and powers. For example, while the plasma electrodes typically operate at 400 to 800 volts, the trigger electrode may have a 5 Kv voltage thereacross. However, this voltage is present for a much shorter time duration, for example, 100 ns, so that the power is much lower, for example 1/20 Joule.

Another potential problem with thrusters of the type shown in FIGS. 1 and 2 is that the Lorenz forces across column 16 are not uniformed, being greatest near center electrode 12 and decreasing more or less uniformly outward therefrom to the cathode outer electrode 14. As a result, gas plasma exits along an angled front, with gas exiting first from the center electrode and later for gas extending out toward the outer electrode. The outer electrode 14 could therefor be shorter to facilitate gas exiting the thruster uniformly across the thruster, although this is not done for preferred embodiments. The taper of this outer electrode is for the same reason as the taper in region 30 of housing 28 and is optional for the same reasons discussed in connection with this tapered region.

The problem of uneven velocity in column 16 is also dealt with in FIG. 2 by having gas enter column 16 from the center electrode, thereby resulting in a greater mass of gas at the center electrode than at the outer electrode. If this is done carefully so that the greater mass near the center electrode offsets the greater accelerating forces thereat, a more nearly uniform velocity can be achieve radially across column 16 so that gas/plasm exits uniformly (i.e. with a front perpendicular to the electrodes) off the end of the thruster. This correction is one reason why a shorter outer electrode is not generally required.

Except for the differences discussed above, the thruster of FIG. 2 operates in the same way as the thruster of FIG. 1. Further, while a single thruster is shown in the figures, in a space or other application, a plurality of such thrusters, for example twelve thrusters, could be utilized, each operating at less than 1 Joule/pulse and weighing less than 1 kg. All the thrusters would be powered by a central power supply, would use a central control system and would receive propellant from a common source. The latter is a particular advantage for the thruster of this invention in that maneuvering life of a space vehicle utilizing the thruster is not dictated by the fuel supply for the most frequently used thruster(s) as is the case for some solid fuel thrusters, but only by the total propellant aboard the vehicle.

Figure 3:
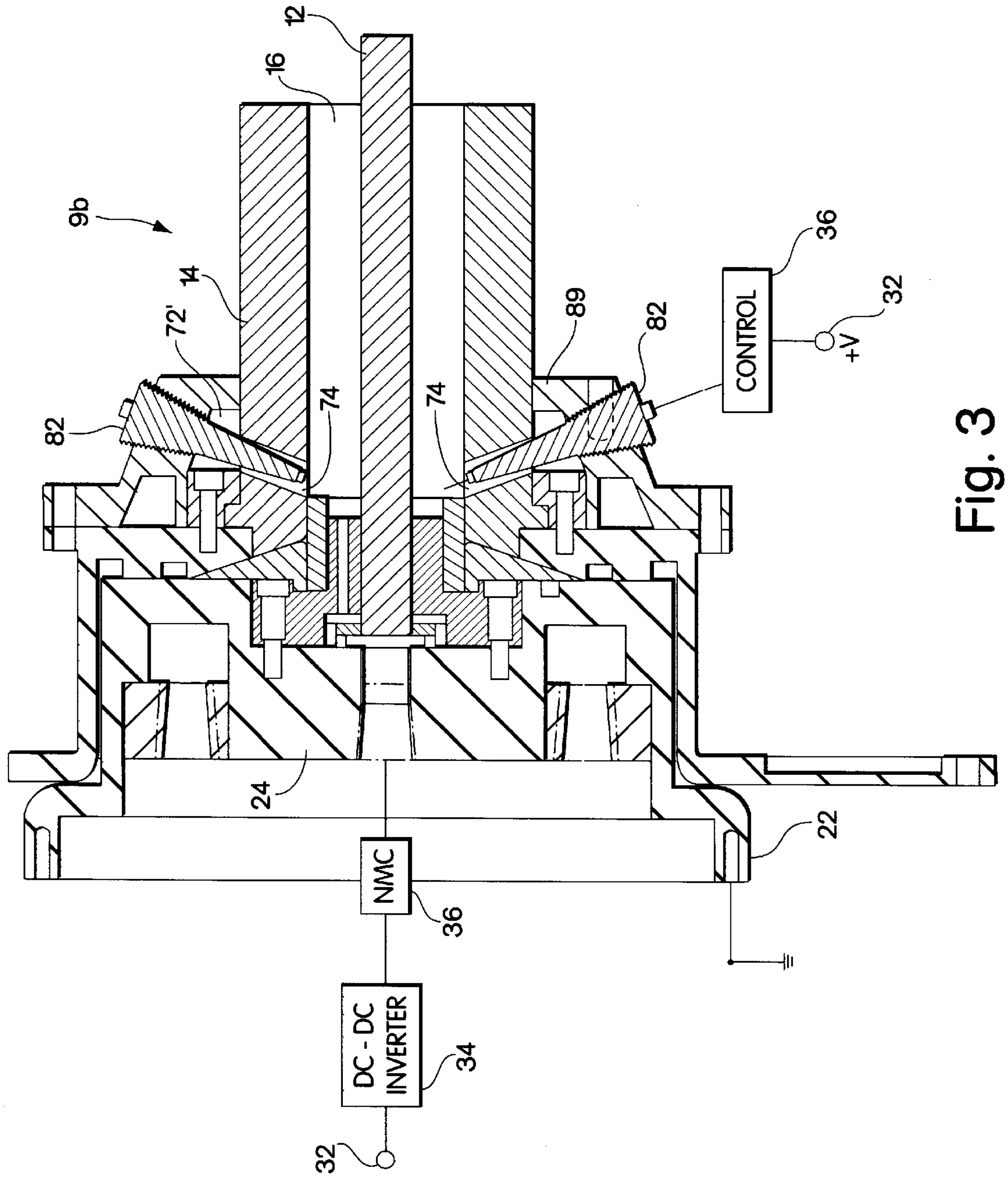
FIG. 3 is semischematic, semi-side cutaway view of a radiation source embodiment of the invention.

FIG. 3 shows another embodiment of a plasma gun in accordance with the teachings of this invention, which gun is adapted for use as a radiation source rather than as a thruster. This embodiment of the invention uses a driver like that shown in FIG. 1 with a dc-dc invertor 34 and a nonlinear magnetic compressor 36, and also has a manifold 72' applying gas through holes 74 of the cathode and around trigger electrodes 82. However, for this embodiment, propellant gas is not inputted from center electrode 12. The cathode electrode also does not taper for this embodiment of the invention and is of substantially the same length as the center electrode 12. Finally, and most important, the length of the electrodes 12 and 14 are shorter for this embodiment of the invention than for the thruster embodiments so that gas/plasma reaches the end the electrodes/column 16 when the discharge current is at a maximum. Typically, the capacitor will be approaching the one-half voltage point at this time. Further, for the radiation source application, outer electrode 14 may be solid or perforated. It has been found that best results are typically achieved with an outer electrode that consists of a collection of evenly spaced rods which form a circle. With the configuration described above, the magnetic field as the plasma is driven off of the end of the center electrode creates a force that will drive the plasma into a pinch and dramatically increase its temperature. The higher the current, and therefor the magnetic field, the higher will be the final plasma temperature. There is also no effort to profile the gas density so as to achieve more uniform velocity across column 16 and a static, uniform, gas fill is typically used. Therefor, the gas need not be introduced at the base end of column 16, although this is still preferred. The gas not being profiled results in the velocity being much higher at center conductor 12 than at the outer conductor 14. The capacitance at the driver, gas density and electrode length are adjusted to assure that the plasma surface is driven off the end of the center electrode as the current nears its maximum value.

Once the plasma is driven off the end of the center conductor, the plasma surface is pushed inward. The plasma forms an umbrella or water fountain shape. The current flowing through the plasma column immediately adjacent the tip of the center conductor provides an inlet pressure which pinches the plasma column inward until the gas pressure reaches equilibrium with the inward directed magnetic pressure.

Temperatures more than 100 times hotter than surface of the sun can be achieved at the pinch using this technique. The radiation intensity at a given wavelength is given in terms of watts/meter$^2$/hertz and varies both as a function of the frequency or wavelength of the radiation, the temperature and the emissivity. The emissivity is a function which has a maximum value of one and it is important to choose a gas which has a maximum emissivity at the desired output frequency/wavelength. For the case of radiation at a wavelength of 13 nm, the radiation is most efficiently produced when the temperature at the pinch is 500,000° K. and the best choices of gases to produce this frequency are xenon and lithium vapor. If xenon is used, it must be confined to the immediate vicinity of the pinch because it is so absorptive at that wavelength. For an illustrative embodiment, the core of the center conductor was filled with lithium which is vaporized by the pinch and continuously replaced from the rear. The column 16 is filled to approximately 1 Torr static pressure of either argon or helium, with helium being the preferred choice. As for the thruster embodiments, this requires that the entire radiation source 90 be maintained in a near vacuum environment and this is further required since radiation in the EUV band is easily absorbed and cannot be used to do useful work in other than a near vacuum environment. Since propellant efficiency is not as critical for this embodiment, there may be a single radiation burst for each valving, or the valving duration and number of pulses/bursts may be selected to provide the radiation for a desired duration.

While parameters have been discussed above for producing radiations at 13 nm, radiation at other wavelengths withing the EUV band may be obtained by controlling various parameters of the radiation source 90, and particularly by careful selection of the gas utilized, the maximum current from the high voltage source, the plasma temperature in the area of the pinch, and the gas pressure in the column.

While a large number of gases can be used for the plasma guns described above, inert gases such as argon and xenon are frequently preferred. Other gases which may be used include nitrogen, hydrazine, helium, hydrogen, neon and at least for the 13 nm radiation source, lithium vapor. Other gases might also be utilized to achieve selected EUV wavelengths where the plasma gun is being used as radiation source.

While various embodiments have been discussed above, it is apparent that these embodiments are by way of example only and are not limitations on the invention. For example, while the drivers illustrated are advantageous for the applications, other high PRF drivers having suitable voltage and rise times, and not requiring high voltage switching, might also be utilized. Similarly, while a variety of plasma initiation mechanisms have been described, with the electrode trigger being preferred, other methods for initiating plasma breakdown might also be utilized in suitable applications. The configurations of the electrodes and the applications give for the plasm gun are also by way illustration. Thus, while the invention has been particularly shown and described above with respect to preferred embodiments, the foregoing and other changes in forming detail may be made therein by one skilled in the art while still remaining within the spirit and scope of the invention and the invention is only to be limited by the following claims.

I claim:

1. A high PRF plasma gun comprising:

a center electrode;

an outer electrode substantially coaxial with said center electrode, a coaxial column being formed between said electrodes, which column has a closed base end and an open exit end;

an inlet mechanism for introducing a selected gas into said column;

a plasma initiator at the base end of said column, and a solid state, high repetition rate pulsed driver operable on plasma initiation at the base of said column for delivering a high voltage pulse across said electrodes, the plasma expanding from the base end of the column and off the exit end thereof.

2. A plasma gun as claimed in claim 1 wherein the voltage of each of said pulses decreases over the duration of the pulse, and wherein the pulse voltage and electrode length are such that the voltage across the electrodes reaches a substantially zero value as the plasma exits the column.

3. A plasma gun as claimed in claim 2 wherein said inlet mechanism delivers the selected gas at the base end of the column.

4. A plasma gun as claimed in claim 3 wherein said inlet mechanism introduce the gas radially from said center electrode, thereby enhancing plasma velocity uniformity across the column.

5. A plasma gun as claimed in claim 2 wherein the plasma exiting the column exits at exhaust velocities in the range of approximately 10,000 to 100,000 meters/sec.

6. A plasma gun as claimed in claim 1 wherein one of said electrodes functions as a cathode electrode, and wherein said plasma initiator includes at least one hole formed at the base end of said cathode electrode.

7. A plasma gun as claimed in claim 6 wherein said inlet mechanism includes an inlet for introducing said selected gas into at least selected ones of said holes.

8. A plasma gun as claimed in claim 7 including a trigger electrode mounted in at least selected ones of said holes, which electrodes are fired to initiate the plasma.

9. A plasma gun as claimed in claim 1 wherein said plasma initiator includes at least one trigger electrode mounted at said base end which electrodes are fired to initiate the plasma.

10. A plasma gun as claimed in claim 9 wherein there are a plurality of said trigger electrodes substantially evenly spaced around the base end of said column, which electrodes are fired substantially simultaneously to provide uniform initiations of the plasma at said base end.

11. A plasma gun as claimed in claim 9 wherein at least one trigger electrode is mounted out of, but closely adjacent to, said channel.

12. A plasma gun as claimed in claim 1 wherein said inlet mechanism includes a pulsed valve, and wherein, for each operation of said pulsed valve, the pulsed driver and plasma initiator is operated a selected plurality of times.

13. A plasma gun as claimed in claim 1 wherein there is a current for each voltage pulse which initially increases to a maximum and then decreases to zero over the duration of the pulse, and wherein the pulse voltage and electrode lengths are such that the current for each pulse is at substantially its maximum as the plasma exits the column.

14. A plasma gun as claimed in claim 13 wherein said outer electrode is a cathode electrode and is in the form of a plurality of substantially evenly spaced rods arranged in a circle.

15. A plasma gun as claimed in claim 13 wherein the inlet mechanism provides a substantially uniform gas fill in said column, resulting in the plasma being initially driven off the center electrode, the plasma being magnetically pinched as it exits the column, raising the plasma temperature to provide thermal radiation at desired wavelengths.

16. A plasma gun as claimed in claim 15 wherein the desired wavelength is in the range of approximately 13 nm, wherein said selected gas is at least one of xenon and lithium vapor, and wherein the plasma temperature in the area of the magnetic pinch is in the range of approximately 500,000° K.

17. A plasma gun as claimed in claim 15 wherein said desired wavelength is in the EUV band between approximately 1 nm and 100 nm, and wherein the selected gas, high voltage current, plasma temperature in the area of the pinch and gas pressure in said column are chosen to provide radiation at said desired wavelength.

18. A plasma gun as claimed in claim 1 wherein said pulsed driver delivers pulses having a voltage which is at least equal to the Paschen minimum breakdown voltage for the gun with fast rise times.

19. A plasma gun as claimed in claim 1 wherein said pulsed driver includes a source of dc potential, a dc-to-dc invertor, and an energy storage medium fed by the invertor, the storage medium discharging across said electrodes when the plasma is initiated.

20. A plasma gun as claimed in claim 19 wherein said plasma initiator operates when a selected energy/voltage is stored in said energy storage medium.

21. A plasma gun as claimed in claim 19 wherein said storage medium is part of at least one non-linear magnetic pulse compressor.

22. A plasma gun as claimed in claim 19 wherein said dc-to-dc converter recovers and stores waste energy reflected from the electrodes for use during the next high voltage pulse.

23. A plasma gun as claimed in claim 1 wherein the selected gas is one of argon, xenon, nitrogen, hydrazine, lithium vapor, helium, hydrogen and neon.

24. A plasma gun as claimed in claim 1 there is a low pressure in said column which is such that breakdown for plasma initiation occurs on the low pressure side of the Paschen curve.

25. A plasma gun as claimed in claim 24 wherein said plasma gun is contained in an environment having an ambient pressure which does not exceed approximately 1 Torr.

26. A plasma gun as claimed in claim 1 wherein said pulsed driver and said plasma initiator have a PRF such that the PRF of said gun is in excess of approximately 100 Hz.

27. A plasma gun as claimed in claim 26 wherein plasma gun has a PRF in the range of approximately 500 Hz to 5,000 Hz.

28. A high PRF thruster for use in a substantially vacuum environment comprising:

a center electrode;

an outer electrode substantially coaxial with said center electrode, a coaxial column being formed between said electrodes, which column has a closed base end and an open exit end;

an inlet mechanism for introducing a selected gas into the base end of said column;

a plasma initiator at said base end; and a solid state, high repetition rate pulsed diver operable concurrent with plasma initiation at the base of said column for delivering a high voltage pulse across said electrodes, the plasma expanding from the base end of the column and off the exit end thereof, the voltage of each pulse decreasing over the duration of the pulse, with the pulse voltage and electrode length being such that the voltage across the electrodes reaches a substantially zero value as the plasma exits the column.

29. A thruster as claimed in claim 28 wherein said inlet mechanism introduce the gas radially from said center electrode, thereby enhancing plasma velocity uniformity across the column.

30. A thruster as claimed in claim 28 wherein the plasma exiting the column exits at exhaust velocities in the range of approximately 10,000 to 100,000 meters/sec.

31. A high PRF source for EUV radiation comprising:

a center electrode;

an outer electrode substantially coaxial with said center electrode, a coaxial column being formed between said electrodes, which column has a closed base end and an open exit end;

an inlet mechanism for introducing a selected gas into said column;

a plasma initiator at the base end of said column, and a solid state, high repetition rate pulsed diver operable on plasma initiation at the base of said column for delivering a high voltage pulse across said electrodes, the plasma expanding from the base end of the column and off the exit end thereof, the current for each voltage pulse initially increasing to a maximum and then decreasing to zero, the pulse voltage and electrode lengths being such that the current for each pulse is at substantially its maximum as the plasma exits the column.

32. A source as claimed in claim 31 wherein the inlet mechanism provides a substantially uniform gas fill in said column, resulting in the plasma being initially driven off the center electrode, the plasma being magnetically pinched as it exits the column, raising the plasma temperature to provide thermal radiation at desired wavelengths.

33. A source as claimed in claim 32 wherein the desired wavelength is in the range of approximately 13 nm, wherein said selected gas is at least one of xenon and lithium vapor, and wherein the plasma temperature in the area of the magnetic pinch is in the range of approximately 500,000° K.

34. A source of claimed in claim 32 wherein the selected gas, high voltage current, plasma temperature in the area of the pinch and gas pressure in said column are chosen to provide radiation at said desired wavelength.

35. A method for utilizing a plasma gun having a center electrode and an outer electrode substantially coaxial with said center electrode, a coaxial column being formed between said electrodes, which column has a closed base end and an open exit end, as a high PRF thruster to provide a selected thrust in a substantially vacuum environment, comprising the steps of:

(a) valving a selected gas into the base end of said column;

(b) charging a solid state, high repetition rate pulsed driver to a selected high voltage, said voltage being applied across the electrodes;

(c) initiating plasma breakdown at said base end when said driver is substantially at said selected voltage, the plasma expanding from the base end of the column and being exhausted from the exit end of the column at high exhaust velocity substantially concurrent with the charge becoming fully discharged; and (d) repeating steps (b) and (c) at high PRF until said selected thrust has been achieved.

36. A method as claimed in claim 35 including the step of terminating the valving step when a quantity of the selected gas sufficient to achieve the selected thrust has been introduced into the column.

37. A method for utilizing a plasma gun having a center electrode and an outer electrode substantially coaxial with said center electrode, a coaxial column being formed between said electrodes, which column has a closed base end and an open exit end, to produce EUV radiation at a desired wavelength, comprising the steps of:

(a) valving a selected gas into said column;

(b) charging a solid state, high repetition rate pulsed driver to a selected high voltage, said voltage being applied across the electrodes;

(c) initiating plasma breakdown at said base end when said driver is substantially at said selected voltage, the plasma expanding from the base end of the column and being exhausted from the exit end of column adjacent the center electrode substantially concurrent with current from said driver across said electrodes being a maximum, the plasma being magnetically pinched as it exits the column, raising the plasma temperature to provide thermal radiation at desired wavelengths.

38. A method as claimed in claim 36 including the step of repeating steps (b) and (c) at high PRF to provide said radiation for a desired duration.

* * * * *